United States Patent [19]
Burris et al.

[11] Patent Number: 6,085,836
[45] Date of Patent: Jul. 11, 2000

[54] WELL PUMP CONTROL USING MULTIPLE SONIC LEVEL DETECTORS

[76] Inventors: Sanford A. Burris, 8950 Redtail Way, Kirtland, Ohio 44094; David R. Hill, 4721 Greenbriar, Lorain, Ohio 44053; Karl F. Scheucher, 7136 Eagle Road, Waite Hill, Ohio 44094-9636

[21] Appl. No.: 08/950,856

[22] Filed: Oct. 15, 1997

[51] Int. Cl.$^7$ ............................................. E21B 47/04
[52] U.S. Cl. .............................. 166/250.03; 166/250.15; 166/53; 166/369
[58] Field of Search ................ 166/53, 369, 250.03, 166/250.15; 73/152.18, 290 V; 367/86, 31; 181/124

[56] References Cited

U.S. PATENT DOCUMENTS

| | | | |
|---|---|---|---|
| 3,823,399 | 7/1974 | Yamanaka | 343/14 |
| 3,909,775 | 9/1975 | Lavigne | 367/32 |
| 4,257,482 | 3/1981 | Kompanek | 166/249 |
| 4,389,164 | 6/1983 | Godbey et al. | 417/36 |
| 4,583,915 | 4/1986 | Montgomery et al. | 417/26 |
| 4,765,186 | 8/1988 | Dieulesaint et al. | 73/290 V |
| 4,793,178 | 12/1988 | Ahern et al. | 73/151 |
| 4,805,156 | 2/1989 | Attali et al. | 367/35 |
| 4,934,186 | 6/1990 | McCoy | 73/151 |
| 4,965,522 | 10/1990 | Hazen et al. | 324/339 |
| 5,064,349 | 11/1991 | Turner et al. | 417/53 |
| 5,099,918 | 3/1992 | Bridges et al. | 166/60 |
| 5,117,399 | 5/1992 | McCoy et al. | 367/99 |
| 5,150,334 | 9/1992 | Crosby | 367/98 |
| 5,200,894 | 4/1993 | McCoy et al. | 364/422 |
| 5,372,482 | 12/1994 | London et al. | 417/12 |

OTHER PUBLICATIONS

Technology Brief Process Controller for Stripper Oil Well Pumping Units 4 pages Oct. 3, 1997 Echometer Brochure Echometer Gun Microphone Assemblies 4 pages Jul. 1997.

*Primary Examiner*—David Bagnell
*Assistant Examiner*—John Kreck
*Attorney, Agent, or Firm*—Forrest L. Collins

[57] ABSTRACT

A method of using a variety of sonic transmissions is utilized to determined fluid level in a well. It is known that wells replenish fluid at different rates even in the same formation or well field. The fluid levers, which may be determined include water and petroleum. The sonic signals may be transmitted through the annulus in a well where the medium is a gas such as methane. The sonic signals may be also be transmitted through the casing or tubing of the well, which is typically steel pipe. Signals are generated, reflected, received, and converted into data. The data is then utilized to determine an initial liquid level P2, a no liquid pumpable state P0, and to activate the pump to pump the liquid, and inactivate the pump at a liquid level P1 above the no liquid pumpable state P0. [Maximum production at minimum pumping cost is achieved for a given well.]

18 Claims, 1 Drawing Sheet

WELL PUMP CONTROL USING MULTIPLE SONIC LEVEL DETECTORS

BACKGROUND OF THE INVENTION

1. Field of the Invention

The present invention relates to determining the level of a fluid in a well such as an oil well or water well.

2. Description of the Art Practices

It is known that wells replenish fluid at different rates even in the same formation or well field. The maximum production from a given well occurs when the fluid level in the well bore is as low as possible compared to the level in the surrounding formation. The rate of fluid flow into the well bore (production) is maximized then because the hydrostatic head driving the fluid is at a maximum.

The preceding observation suggests that the well pump should run constantly to keep the level in the well bore as low as possible thus maximizing production. Of course, this is unsatisfactory for several reasons.

First, running the pump constantly or at too great a speed is inefficient since, some of the time, the well bore is completely empty and there is nothing to pump. Thus energy conservation becomes a cost consideration. Second, the equipment is subject to wear and damage resulting in costly repairs when pumps are run dry. Third, paraffin build up is more pronounced when a well is allowed to pump dry. In the dry pump condition gases are drawn into the bore. The gases in the bore then expand and cool. As the gases cool, paraffin build up is promoted as these high melting hydrocarbons begin to plate out on the surfaces of the bore.

Given the above considerations, control strategies aimed at optimizing well production have emerged. Notably, timers have been used to control the pump duty cycle. A timer may be programmed to run the well nearly perfectly if the one could determine the duration of the on cycle and off cycle which keeps the fluid level in the bore low but which does not pump the bore dry, and if steady conditions in the bore and with the equipment prevail.

The pump on cycle and off cycle can be determined for a group of wells or for an entire well field. Savings in energy may be maximized by knowing which wells fill at what rate and then optimizing pumping to reduce or maintain a constant electric load below the maximum peak available.

Given fluid level information, deciding when or how fast to run the pump is very straight forward and production can be optimized. Fluid level determinations, particularly for deep down hole (bore) systems, have been implemented. Unfortunately, these deep down hole have been costly and complex to install, unreliable in operation, and costly to repair or service. Although the implementation details will not be discussed here, it is worth noting that these systems, when operating correctly, have proven that significant gains in well production are available when control strategies using fluid level measurement are applied.

Clearly, what is needed is a control system with the advantages of fluid level measurement which is cost effective to install and operate and which is reliable. Basic features for fluid level measurement should include applicability to oil, water, or other wells and should be applicable to rod, screw, or other pump types.

A fluid level measurement system should be simple and inexpensive to install in the T-Head and useful for well depths to 10,000 feet. Such a fluid level measurement system should be self calibrating for each installation and accurate to 10 feet (3.1 meters) and robust to harsh environments within and around the well.

SUMMARY OF THE INVENTION

In a first aspect, the present invention deals with a method to set pump activate and pump inactivate conditions, in a well containing a pumpable liquid, to pump the liquid comprising:

transmitting a first continuous sonic signal at a first frequency to a well casing thereby creating a reflected well casing sonic signal;

receiving the reflected well casing sonic signal from first sonic signal;

transmitting a second continuous sonic signal at a second frequency, different than said first frequency, to a well tubing thereby creating a reflected well tubing sonic signal;

receiving a reflected well tubing sonic signal from said second sonic signal;

transmitting a third continuous sonic signal at a third frequency, different than said first frequency and different than said second frequency, to the well annulus;

receiving a reflected well annulus sonic signal from said third sonic signal;

utilizing at least one of the reflected signals corresponding to the transmitted signal to determine an initial liquid level P2 of the well;

pumping the liquid from the well until the well is at a no liquid pumpable state P0;

utilizing at least one of the reflected signals corresponding to the transmitted signal to determine the no liquid pumpable state P0;

storing the data generated from the reflected signal used at the no liquid pumpable state P0;

storing the data generated from the corresponding transmitted signal at the initial liquid level P2 of the well;

continuously monitoring the liquid level of the well and converting the data generated to activate the pump to pump the a liquid at a liquid level less than or equal to the initial liquid level P2;

continuously monitoring the liquid level of the well and converting the data generated to inactivate the pump at a liquid level P1 above the no liquid pumpable state P0;

thereby activating the pump and inactivating the pump to pump the liquid.

A second aspect of the invention is a method to set pump activate and pump inactivate conditions, in a well containing a pumpable liquid, to pump the liquid comprising:

selectively transmitting a first sonic signal at a first frequency to a well casing thereby creating a reflected well casing sonic signal;

receiving the reflected well casing sonic signal, when said first sonic signal is transmitted, from said first sonic signal;

selectively transmitting a second sonic signal at a second frequency, different than said first frequency, to a well tubing thereby creating a reflected well tubing sonic signal;

receiving a reflected well tubing sonic signal, when said second sonic signal is transmitted, from said second sonic signal;

selectively transmitting a third sonic signal at a third frequency, different than said first frequency and different than said second frequency, to the well annulus;

receiving a reflected well annulus sonic signal, when said third sonic signal is transmitted;

utilizing at least two of the reflected signals from the corresponding transmitted signals to determine the initial liquid levels P2 of the well;

pumping the liquid from the well until the well is at a no liquid pumpable state P0;

utilizing at least two of the reflected signals corresponding to the transmitted signals to determine the no liquid pumpable state P0;

storing the data generated from the reflected signals used at the no liquid pumpable state P0;

storing the data generated from the corresponding transmitted signal at the initial liquid level P2 of the well;

monitoring the liquid level of the well and converting the data generated to activate the pump to pump the liquid at a liquid level less than or equal to the initial liquid level P2;

monitoring the liquid level of the well and converting the data generated to inactivate the pump at a liquid level Pi above the no liquid pumpable state P0;

thereby activating the pump and inactivating the pump to pump the liquid.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE INVENTION

The basic components of an acoustical measurement system are a Digital Signal Generator 10 which is a programmable generator capable of generating arbitrary wave forms in the sub-sonic to ultra-sonic bands. An Output Amplifier 20—drives a transmitter at varying amplitudes with the signals from the Digital Signal Generator 10.

A series of Acoustic Transmitters 30, 32, and 34 converts the drive signal from the Output Amplifier 20 into a pressure wave. A series of Acoustic Receivers 40, 42 and 44 receives reflected acoustic signals from the Acoustic Transmitters 30, 32, and 34.

An Input Amplifier 50 conditions and amplifies signals from the Acoustic Receivers 40, 42 and 44 and provides appropriate output levels to a Digital Signal Analyzer 60.

The Digital Signal Analyzer 60 digitizes the signals received from the Acoustic Receivers 40, 42 and 44 and performs processing upon the resulting information in order to yield accurate fluid level data. A High Resolution Digital Clock is used for both signal generation and analysis phases. A Data Storage Device 80 is employed to receive and retrieve data.

In practice the distance from the acoustical transmitter location (at the well head) to the fluid level in the bore below is essentially the entire depth of the bore. Differences in this distance correspond directly to changes in fluid level.

Figure 2:
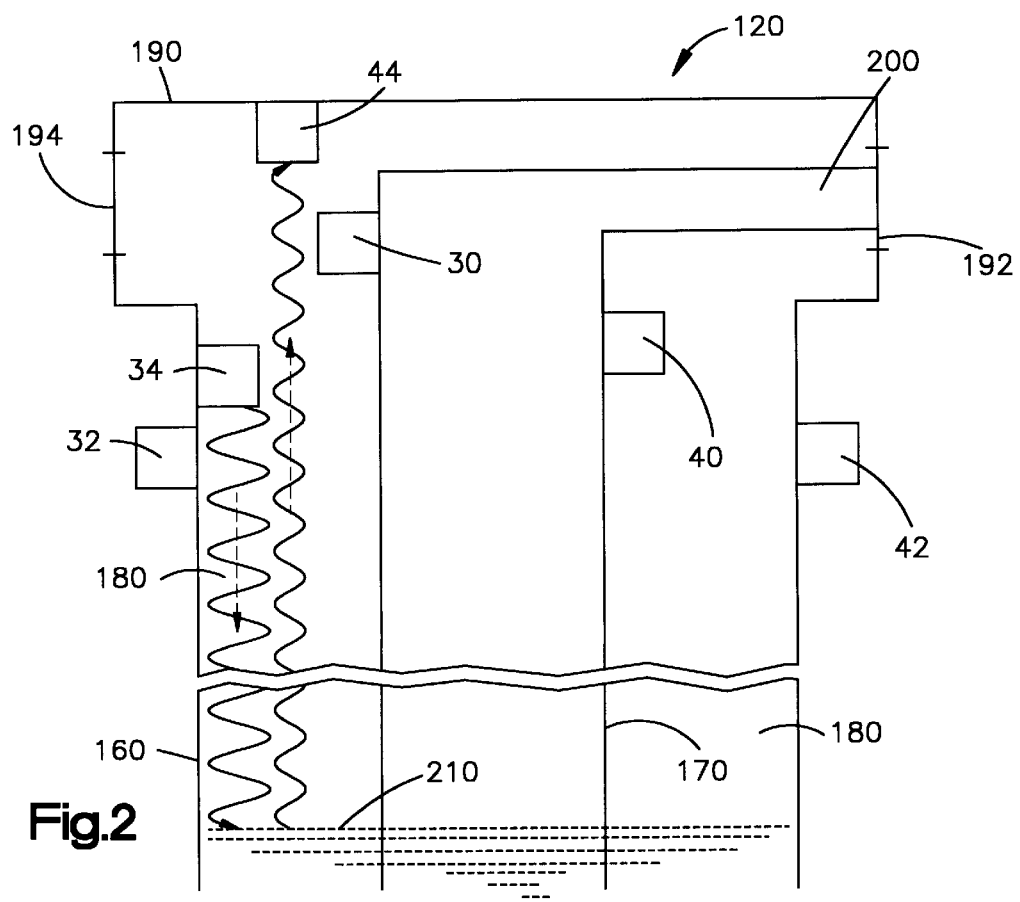
FIG. 2 is a line drawing of a well head system.

Referring to FIG. 2, a partial sectional view of a well head system 120 is shown. The well head system 120 comprises a well casing 160 as is known in the art. The well casing 160 is located within the well bore (not shown). Within the well casing 160 is the well tubing 170. The well tubing 170 extends downward in thee well casing 160 forming an annulus 180 between the outer surface of the well tubing 170 and the inner surface of the well casing 160.

The well casing 160 is capped with a standard T-Heads, connection 190. The T-Head connection 190 has two openings 192 and 194. One of the two openings 192 in the T-Head connection 190 is utilized to remove, in the case of an oil and gas well, the oil and gas through pipe 200. The second opening 194 is utilized to insert various components of the present invention into an existing well casing 160. Where the well is new the various components of the present invention are installed directly into the bore, or through the T-Head connection 190.

Affixed to the well tubing 170 is the Acoustic Transmitter 30. The Acoustic Receiver 40 is affixed to the opposite side of the well tubing 170. The choice of the location of the Acoustic Receiver 40 is simply for convenience as it may also be affixed to the inner surface of the T-Head connection 190. It is preferred that Acoustic Receiver 40 is directly connected to the component to which the signal from the acoustical receiver is delivered.

The second Acoustic Transmitter 32 is affixed to the outer surface of the well casing 160. A second Acoustic Receiver 42 is connected to the outer surface of the well casing 160.

The third Acoustic Transmitter 34 is attached to the inner surface of the well casing 160. A third Acoustic Receiver 44 is attached to the inner surface of the T-Head connection 190.

The present invention determines the fluid level 210 of the well, whether, P2, P1, or P0, by determining the distance directly or by harmonics according to well known equations. The present invention operates to check each determination. For instance, the well casing 160 is surrounded on its outer surface by voids, rock strata, sand, water, petroleum, drilling cements and all other manner of material found in and around a bore. The inner surface of the well casing 160 is in contact with gases from the surrounding formations and at the lower reaches of the bore of the well casing 160 is the fluid level 210. The inner surface of well casing 160 is also subject over time to build up of paraffin, scale, and leakage of elements from outside of the well casing 160.

The annulus 180 contains primarily gases and at the lower reaches of the annulus 180 is the fluid level 210. The annulus 180 is also subject to the well tubing 170. The well tubing 170 contains primarily fluid at the lower reaches of the bore. At the upper reaches of the bore, or below the residual liquid level in the bore there is the potential for a build up of scale and paraffin.

The fluid level 210 to be determined is thus subject to many parameters, some predicable and some not. In short the various conditions within the well casing 160, the well tubing 170 and the the annulus 180 are dynamic.

Figure 1:
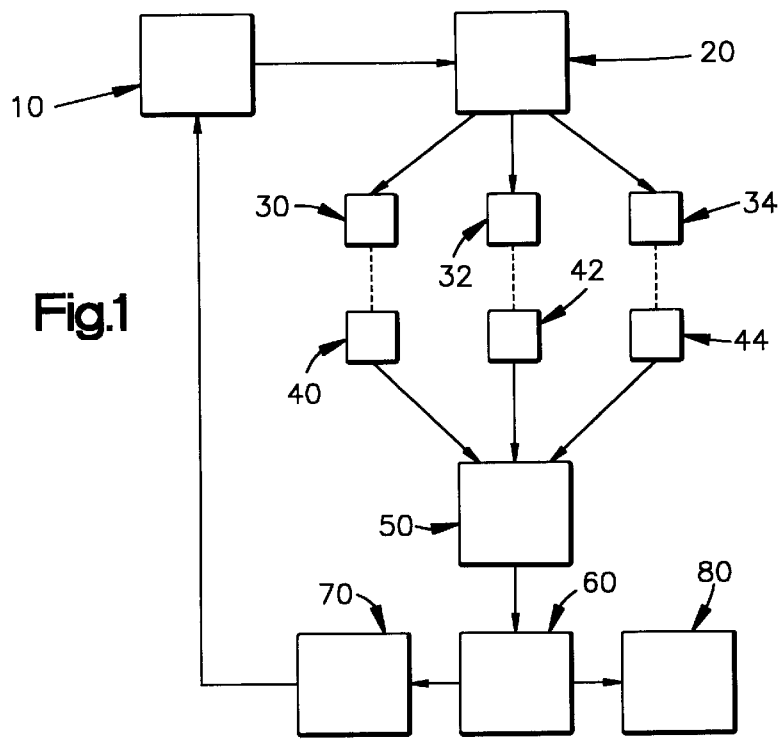
FIG. 1 is a electrical block diagram of the electronic components.

In practice a electronic event originated at Digital Signal Generator 10 in FIG. 1 is fed to the Output Amplifier 20. From the Output Amplifier 20, a series of Acoustic Transmitters 30, 32, and 34 converts the amplified electronic event to a sonic event.

In this example each of the Acoustic Transmitters 30, 32, and 34 simultaneously and continuously emit a signal from their respective positions according to FIG. 2. The sonic events from the Acoustic Transmitters 30, 32, and 34 are reflected in the bore at a time when the fluid level 210 is at P2. The reflected signals are received by the Acoustic Receivers 40, 42 and 44. The characteristics of each signal received by the Acoustic Receivers 40, 42 and 44 is fed to the Input Amplifier 50 to condition and amplify each signal. The data for a P2 level is analyzed by the Digital Signal Analyzer 60 and transmitted to the Data Storage Device 80.

The well is then pumped to a well dry condition, which would occur anyway for many wells, to obtain a P0 level. Each of the Acoustic Transmitters 30, 32, and 34 simultaneously and continuously emit a signal from their respective positions according to FIG. 2. The sonic events from the Acoustic Transmitters 30, 32, and 34 are reflected in the bore at a time when the fluid level 210 is at P0. The reflected signals are received by the Acoustic Receivers 40, 42 and 44. The characteristics of each signal received by the Acoustic Receivers 40, 42 and 44 at the P0 level is fed to the Input Amplifier 50 to condition and amplify each signal. The data for a P0 level is analyzed by the Digital Signal Analyzer 60 and transmitted to the Data Storage Device 80.

The well is then allowed to refill to an arbitrary level between the P0 and P2 level. One or more further measurements are taken as described above and are processed accordingly into the Data Storage Device 80. From the foregoing data pump on and pump off times may be set to minimize pumping time, minimize pumping costs in energy and repair, and to maximize fluid output. In one aspect of the invention the data generated can be utilized to check, and recheck, components subject to the greatest wear and abuse, e.g. the Acoustic Transmitters 30, 32, and 34; and the Acoustic Receivers 40, 42 and 44. Well conditions down hole may be analyzed by comparing recent data to stored data to determine, for example, paraffin build up.

What is claimed is:

1. A method to set pump activate pump inactivate conditions, in a well containing a pumpable liquid, to pump the liquid comprising:
   transmitting a first continuous sonic signal at a first frequency to a well casing thereby creating a reflected well casing sonic signal;
   receiving the reflected well casing sonic signal from first sonic signal thereby generating data;
   transmitting a second continuous sonic signal at a second frequency, different than said first frequency, to a well tubing thereby creating a reflected well tubing sonic signal;
   receiving a reflected well tubing sonic signal from said second sonic signal thereby generating data;
   transmitting a third continuous sonic signal at a third frequency, different than said first frequency and different than said second frequency, to the well annulus;
   receiving a feflected well annulus sonic signal from said third sonic signal thereby generating data;
   utilizing at least one of the reflected signals corresponding to the transmitted signal to determine an initial liquid level P2 of the well from said data;
   pumping the liquid from the well until the well is at a no liquid pumpable state P0;
   utilizing at least one of the reflected signals corresponding to the transmitted signal to determine the no liquid pumpable state P0;
   storing said data generated from the reflected signal used at the no liquid pumpable state P0;
   storing said data generated from the corresponding transmitted signal at the initial liquid level P2 of the well;
   continuously monitoring the liquid level of the well and converting said data generated to activate the pump to pump the liquid at a liquid level less than or equal to the initial liquid level P2;
   continuously monitoring the liquid level of the well and converting said data generated to inactivate the pump at a liquid level P1 above the no liquid pumpable state P0;
   thereby activating the pump and inactivating the pump to pump the liquid.

2. The method of claim 1 wherein said data generated from the transmitted signals and the reflected signals are averaged to determine at least one of P0 and P2.

3. The method of claim 1 wherein all three of the reflected signals corresponding to the transmitted signals are utilized to determine the no liquid pumpable state P0.

4. The method of claim 1 wherein all three of the reflected signals corresponding to the transmitted signals are utilized to determine the initial liquid level P2 of the well.

5. The method of claim 4 wherein said data generated from the transmitted signals and the reflected signals are averaged to determine at least one of P0 and P2.

6. The method of claim 1 wherein the transmitted signals and the reflected signals are averaged to determine the P1 level.

7. The method of claim 1 wherein the transmitted signals and the reflected signals are utilized to determine the P1 level.

8. The method of claim 1 wherein the pumpable liquid is petroleum based.

9. The method of claim 1 wherein the pumpable liquid is aqueous based.

10. A method to set pump activate and pump inactivate conditions, in a well containing a pumpable liquid, to pump the liquid comprising:
    selectively transmitting a first sonic signal at a first frequency to a well casing thereby creating a reflected well casing sonic signal;
    receiving the reflected well casing sonic signal, when said first sonic signal is transmitted, from said first sonic signal;
    selectively transmitting a second sonic signal at a second frequency, different than said first frequency, to a well tubing thereby creating a reflected well tubing sonic signal;
    receiving a reflected well tubing sonic signal, when said second sonic signal is transmitted, from said second sonic signal;
    selectively transmitting a third sonic signal at a third frequency, different than said first frequency and different than said second frequency, to the well annulus;
    receiving a reflected well annulus sonic signal, when said third sonic signal is transmitted;
    utilizing at least two of the reflected signals from the corresponding transmitted signals to determine the initial liquid levels P2 of the well;
    pumping the liquid from the well until the well is at a no liquid pumpable state P0;
    utilizing at least two of the reflected signals corresponding to the transmitted signals to determine the no liquid pumpable state P0;
    storing said data generated from the reflected signals used at the no liquid pumpable state P0;
    storing said data generated from the corresponding transmitted signal at the initial liquid level P2 of the well;
    monitoring the liquid level of the well and converting said data generated to activate the pump to pump the liquid at a liquid level less than or equal to the initial liquid level P2;
    monitoring the liquid level of the well and converting said data generated to inactivate the pump at a liquid level P1 above the no liquid pumpable state P0;
    thereby activating the pump and inactivating the pump to pump the liquid.

11. The method of claim 10 wherein said data generated from the transmitted signals and the reflected signals are average to determine at least one of P0 andP2.

12. The method of claim 10 wherein all three of the reflected signals corresponding to the transmitted signals are utilized to determine the no liquid pumpable state P0.

13. The method of claim 10 wherein all three of the reflected signals corresponding to the transmitted signals are utilized to determine the initial liquid levels P2 of the well.

14. The method of claim 13 wherein said data generated from the transmitted signals and the reflected signals are averaged to determine at least one of P0 and P2.

15. The method of claim 10 wherein the transmitted signals and the reflected signals are averaged to determine the P1 level.

16. The method of claim 10 wherein the transmitted signals and the reflected signals are utilized to determine the P1 level.

17. The method of claim 10 wherein the pumpable liquid is petroleum based.

18. The method of claim 10 wherein the pumpable liquid is aqueous based.

* * * * *